(No Model.) 2 Sheets—Sheet 1.
W. C. EVANS & J. P. SMITH.
NAILING MACHINE.
No. 367,282. Patented July 26, 1887.
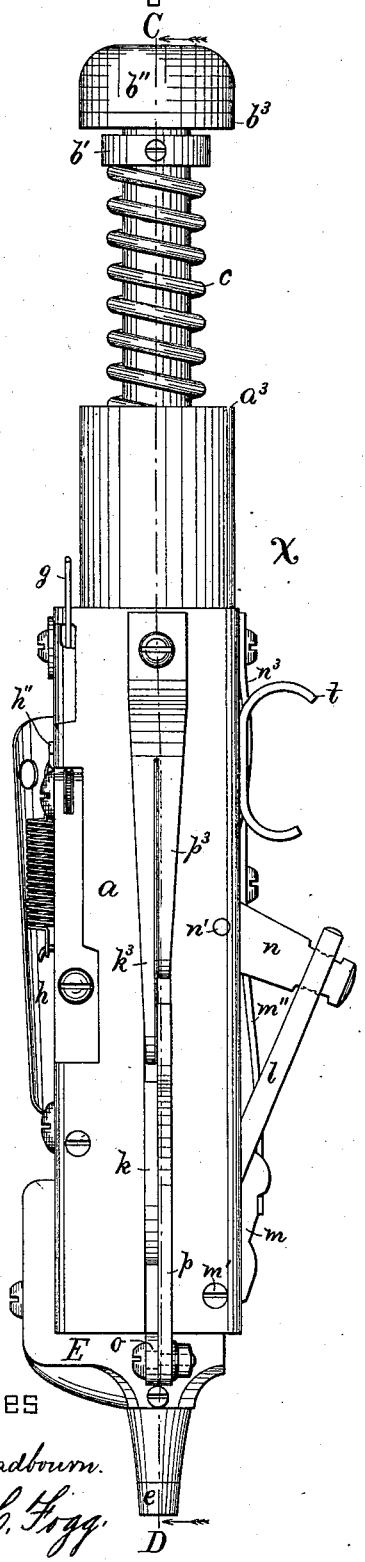
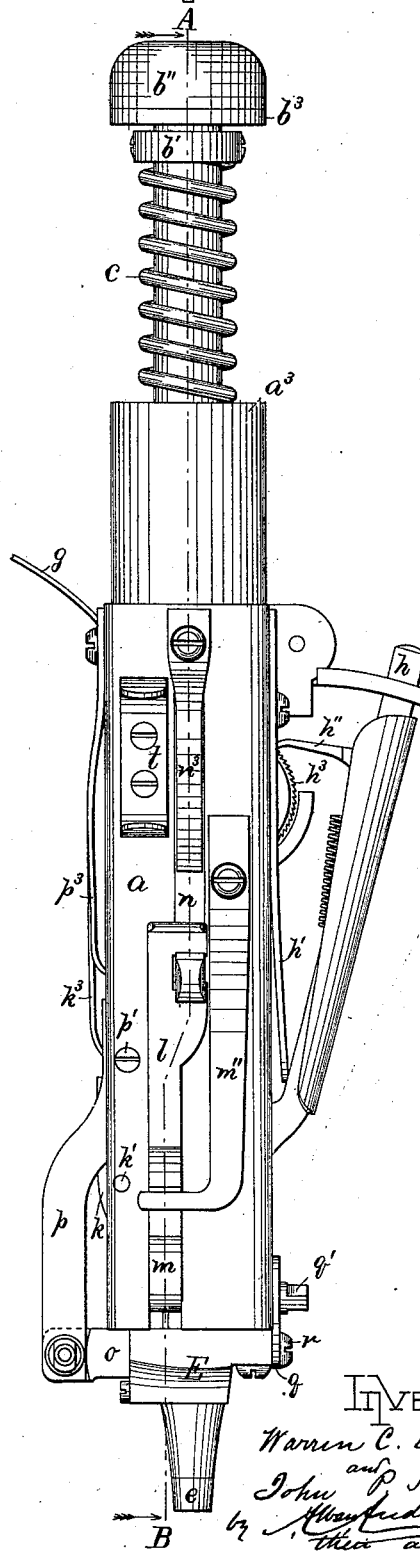
Witnesses
Henry Chadbourn.
Charles H. Fogg.
Inventors
Warren C. Evans
John P. Smith
by their attys.

(No Model.) 2 Sheets—Sheet 2.
W. C. EVANS & J. P. SMITH.
NAILING MACHINE.
No. 367,282. Patented July 26, 1887.
Fig. 3. Fig. 4.
Fig. 5.
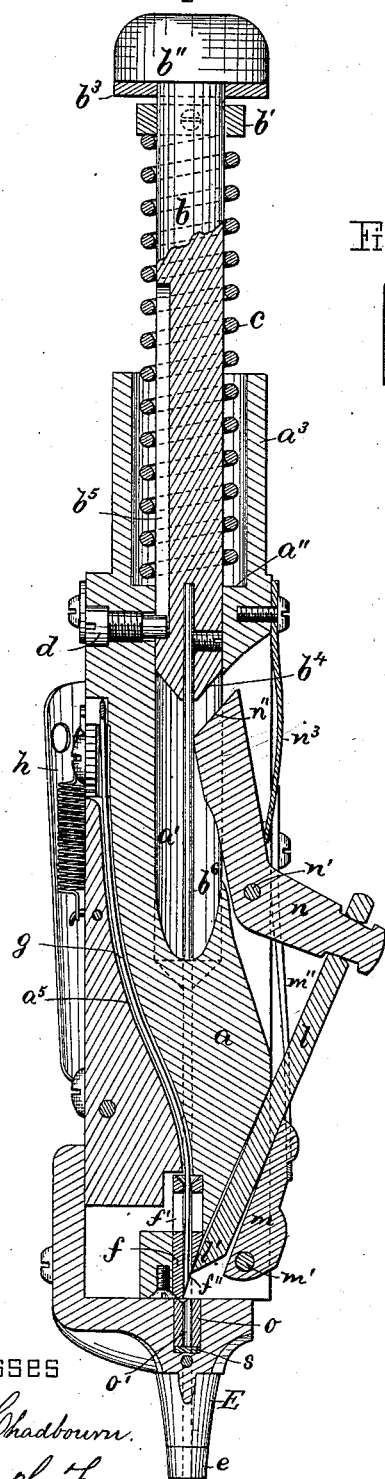
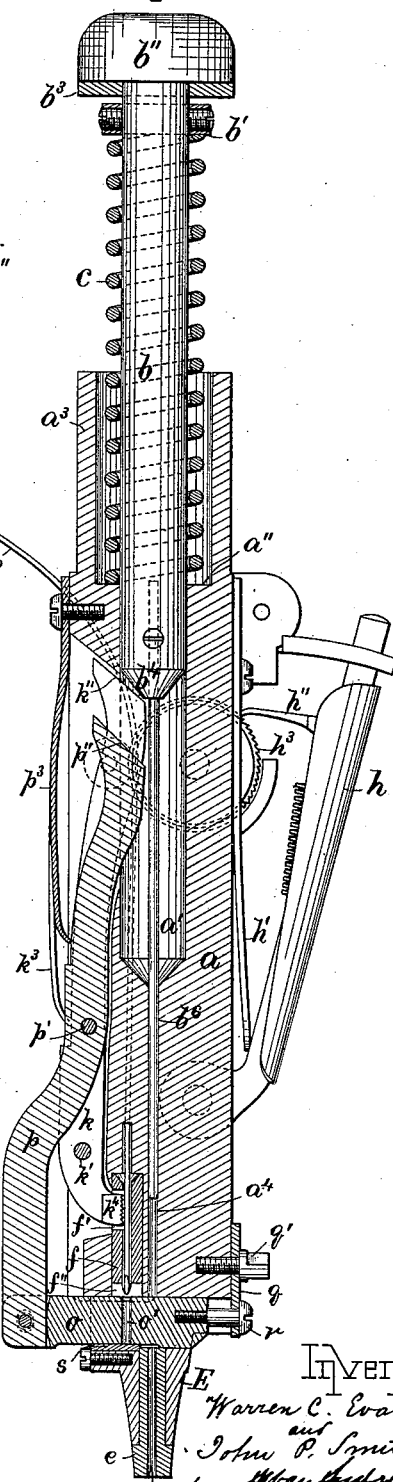
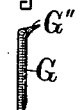
Witnesses
Henry Chadbourn.
Charles H. Fogg.
Inventors
Warren C. Evans
and
John P. Smith.
by their atty.
N. PETERS, Photo-Lithographer, Washington, D. C.

UNITED STATES PATENT OFFICE.

WARREN C. EVANS AND JOHN P. SMITH, OF EXETER, NEW HAMPSHIRE.

NAILING-MACHINE.

SPECIFICATION forming part of Letters Patent No. 367,282, dated July 26, 1887.

Application filed May 12, 1886. Serial No. 201,949. (No model.)

*To all whom it may concern:*

Be it known that we, WARREN C. EVANS and JOHN P. SMITH, both citizens of the United States, residing at Exeter, in the county of Rockingham and State of New Hampshire, have jointly invented certain new and useful Improvements in Nailing-Machines; and we do hereby declare that the same are fully described in the following specification and illustrated in the accompanying drawings.

This invention relates to improvements in nailing-machines for the purpose of nailing, pegging, or lasting boots and shoes; and it relates, particularly, to improvements upon the apparatus for this purpose for which an application for a patent was filed by us on January 4, 1886, Serial No. 187,606.

Our present invention is carried out as follows, reference being had to the accompanying drawings, where—

Figure 1 represents a front view of the improved nailing-machine. Fig. 2 represents a side view of the same, as seen from X in Fig. 1. Fig. 3 represents a vertical section on the line A B, shown in Fig. 2; and Fig. 4 represents a vertical section on the line C D, shown in Fig. 1. Fig. 5 represents a side view of the nail as cut off from the wire within the machine.

Similar letters refer to similar parts wherever they occur on the different parts of the drawings.

$a$ is the frame or handle, as usual, having a cylindrical longitudinal recess, $a'$, in which the driver-bar $b$ is guided, as usual. The driver-bar $b$ is normally held in its highest position by the influence of the coiled spring $c$, that surrounds said driver-bar between the offset or shoulder $a''$ on frame $a$ and an adjustable collar, $b'$, secured to the driver-bar near its upper end by means of suitable set-screws, as shown, by which arrangement the pressure of the spring $c$ may be varied, as may be required, simply by raising or lowering the collar $b'$ on the bar $b$ and securing it to the latter in the desired position.

$b''$ is the head of driver-bar, as usual, and $b^3$ is a leather or other soft washer placed below said head, as shown in the drawings. Such washer is adapted to come in contact with the upper end of the tubular extension $a^3$ on frame $a$ when the driver-bar is forced downward to the limit of its stroke, so as to soften the blow on the driver-bar at this point of its stroke. The lower end, $b^4$, of the driver-bar is inclined or tapering, as shown in Figs. 3 and 4, for the purpose of actuating the wire-holding and corrugating lever, the cutting-device lever, and the nail-carrying lever, as will hereinafter be more fully described.

$b^5$ is a longitudinal groove on one side of the driver-bar $b$, into which fits loosely the inner end of the pin or screw $d$, as usual, such pin or screw being secured to frame $a$, to prevent the driver-bar from turning around its axis while moving up and down in its bearing in frame $a$.

$b^6$ is the driver, as usual, secured to the lower end of the driver-bar $b$, and guided in a corresponding perforation, $a^4$, in the lower portion of frame $a$, such perforation being centrally in a line with the driver-bar $b$ above it, and with the perforation $e'$ in the nail-tube $e$ below it, as is usual on nail-driving machines. The nail-tube $e$ is driven into or otherwise secured in the lower perforated end of the nail-tube bracket E, which latter is secured in a suitable manner to the lower end of the frame $a$, as shown in the drawings.

On one side of the nail-driver perforation $a^4$ is located, within a recess in the lower portion of frame $a$, the stationary wire-clamping tube $f$, through which the wire $g$ is intermittently fed downward through the channel $a^5$ in frame $a$, as shown in Fig. 3.

The feeding mechanism for intermittently feeding the wire $g$ (from a reel or otherwise) through channel $a^5$ and into clamping-tube $f$ is precisely the same as shown and described in our previous application above mentioned, and consists of a lever, $h$, hinged in its lower end to frame $a$, and normally held outward in the position shown in Figs. 2 and 4 by the influence of spring $h'$, the lever $h$ having hinged to it near its upper end the pawl $h''$, that acts on the ratchet-wheel $h^3$, journaled on a stud in frame $a$, and having attached to it a grooved feed-roller, between which and a correspondingly-grooved second roller the wire is fed downward the desired distance whenever the operator grasps handle $a$ and presses the lever $h$ toward the frame $a$ against the influence of the spring $h'$, in the usual and well-known manner common for feeding wire in nailing-machines.

At $k'$, on one side of the frame $a$, is pivoted the clamping-lever $k$, having inclined or cam-shaped upper end, $k''$, as shown in Fig. 4; and it is normally held in the position shown in said figure by means of the spring $k^2$, secured in its upper end to frame $a$, and having its lower end pressing on lever $k$ at a point between its fulcrum and upper end, as shown. The lower end of lever $k$ has a serrated or corrugated clamping-piece, $k^4$, adapted to enter through a side opening or cut-away portion, $f'$, in clamping-tube $f$, as shown in Figs. 3 and 4, so as to hold the wire $g$ firmly in said clamping-tube when the upper end of lever $k$ is forced outward by the lower end of the driver-bar acting on it when said driver-bar first commences to pass downward. By having the clamping-piece $k^4$ made serrated or corrugated, as described, it will not alone cause the wire to be held very firmly in the clamping-tube $f$ while said wire is being cut off and heated, but it will also cause the wire to be serrated, indented, or corrugated, so as to hold more firmly when driven in the boot or shoe sole.

One side of clamping-tube $f$ is made tapering, as shown at $f'''$ in Fig. 3, and in contact with such tapering side lies the lower wedge-shaped edge, $l'$, of the shearing or cutter bar $l$, that passes obliquely through a groove or recess in the lower portion of the frame $a$, as shown in Fig. 3, and it is properly guided in its up-and-down motion in such recess by means of the guide-piece $m$, pivoted at $m'$ to frame $a$, and having its upper end held in contact with the bar $l$ by means of the spring $m''$, secured to frame $a$, and having its free end pressing on the outside of guide-piece $m$, as shown in Figs. 2 and 3, by which arrangement the cutter-bar $l$ is properly guided, and any wear on it is compensated for by the spring-pressed guide-piece $m$.

$n$ is a bent lever pivoted to frame $a$ at $n'$, and having its outer end passing through a perforation in the upper end of cutter-bar $l$, as shown in Figs. 1 and 3.

$n''$ is the upper inclined or cam-shaped upper end of lever $n$, that is actuated by the lower inclined end of the driver-bar as the latter is forced downward. The lever $n$ is normally held in the position shown in Fig. 3 by the influence of spring $n^3$, the upper end of which is secured to the frame $a$ and the free end pressing on the outside of lever $n$ between its fulcrum and upper end, as shown in Fig. 3.

$o$ is the laterally-movable nail-carrier adapted to slide forward and back in a groove or recess in the upper portion of the nail-tube bracket E, as shown in Figs. 3 and 4, such carrier having a vertical perforation, $o'$, located in a line with and centrally below the vertical perforation in the clamping-tube $f$ when the carrier $o$ is in position for receiving the wire from the clamping-tube $f$, as shown in Figs. 3 and 4. After the wire has been fed into the perforation in the nail-carrier $o$, been clamped in the clamping-tube $f$, and a length of nail cut off, the carrier $o$ is moved laterally, so that its perforation $o'$ and the nail held therein shall come in a line with the nail-driver perforation $a^4$ and nail-tube perforation $e'$, such movement being accomplished by means of lever $p$, pivoted at $p'$ to frame $a$ and jointed in its lower end to the carrier $o$, as shown in Fig. 4. The upper end, $p''$, of lever $p$ is inclined or cam-shaped, and is forced outward by the driver-bar as it descends, and a spring, $p^3$, returns the lever $p$ to its normal position, (shown in Fig. 4,) when the driver-bar is carried upward to the position shown in said Fig. 4. The said spring $p^3$ is secured in its upper end to frame $a$, and its lower free end presses on the outside of lever $p$ at a point between its fulcrum and upper end, as shown in said Fig. 4.

$q$ is a stop-plate secured by means of screw $q'$ to frame $a$, by which arrangement the motion of carrier $o$ is limited in one direction. A set-screw, $r$, passing loosely through a perforation in the stop-plate $q$ and screwed into the end of carrier $o$, limits the motion of the latter in the opposite direction to receive the nail-wire from the clamping-tube $f$, and after the nail has been cut to convey it directly below the driver and above the nail-tube perforation, as described.

Below the nail-carrier $o$ is secured in the nail-bracket E the small steel or metal plate $s$, that serves as a rest for the lower end of the wire when fed downward through the clamping-tube $f$ into perforation $o'$, as shown in Figs. 3 and 4.

$t$, in Figs. 1 and 2, is a thumb-rest adapted to receive the thumb of the operator while holding and operating the machine.

G, in Fig. 5, represents the nail as cut off from the wire $g$ by the cutter-bar $l\,l'$, the point G' of said nail being made by the cutting-edge of said bar, while the head G'' is produced by the inclined lower end of said cutter-bar bending the upper end of the detached wire to one side, as shown in Fig. 5.

The operation of the machine is as follows: We will suppose the different parts in their respective positions, as represented in the drawings, and the lower end of the nail-wire cut off to an inclined point, as represented in Fig. 3. The operator then grasps the frame or handle $a$ and places the lower end of nail-tube $e$ upon that part of the shoe-sole where the nail is to be driven. By forcing lever $h$ by one hand toward frame $a$ the requisite length of nail-wire is fed downward in the same manner as described in our previous application above mentioned, its lower end passing into carrier-perforation $o'$ in carrier $o$. By forcing the driver-bar $b$ downward, either by a blow from the hand, a mallet, or other suitable means, its lower inclined end $b^4$ first comes in contact with the upper end of clamping-lever $k$, causing its lower serrated end $k^4$ to impinge on, serrate, and hold the wire firmly in the clamping-tube $f$. As the driver-bar descends further, it comes in contact with the rock-lever $n$, causing the cutter-bar $l$ to move downward in an inclined direction toward the axis of the wire and to pass by it and shear it off, and in so doing forming a one-sided bead-head, $G''$, on the nail sheared off from the wire $g$, and leaving a tapering point, $G'$, on the remaining portion of the wire $g$. By the further descent of the driver-bar $b$ the carrier-lever $p$ is actuated, by which the carrier $o$ is moved laterally, so that its perforation $o'$ and the headed and pointed nail held therein comes in a line with the nail-driver perforation $a^4$ and nail-tube perforation $e'$, and as the driver-bar $b$ continues to descend its driver $b^6$ will pass downward through the perforations $a^4$, $o'$, and $e'$, thus driving the nail into the material. During the upward motion of the driver-bar $b$, as caused by the influence of the spring $c$ after the blow on the head $b''$ has been given, the levers $p, n,$ and $k$ remain in the positions hereinabove last mentioned until the lower end of the driver $b^6$ has passed out of the nail-carrier perforation $o'$, when the levers $p$, $n$, and $k$ and their respective connections are returned to their normal positions (shown in Figs. 3 and 4) by the influence of the springs $p^3$, $n^3$, and $k^3$, and the machine is now in a condition for feeding, clamping, and cutting off another portion of the wire, forming a nail, carrying it centrally below the driver, and driving it into the material, and so on.

Having thus fully described the nature, construction, and operation of our invention, we wish to secure by Letters Patent, and claim—

1. In a nailing-machine, the frame $a$ and reciprocating driver-bar $b$, in combination with the clamping-lever $k$, pivoted to frame $a$, and having its lower clamping end, $k^4$, adapted to enter the tube $f$, for the purpose of holding the wire firmly in position while a nail is severed from it, as set forth.

2. In a nailing-machine, the frame $a$ and driver-bar $b$, in combination with the lever $k$, its spring $k^3$, and clamping-surface $k^4$, as and for the purpose set forth.

3. In a nailing-machine, the frame $a$ and reciprocating driver-bar $b$, in combination with the lever $p$, its spring $p^3$, perforated carrier $o$, and stop device $q\, r$, all combined and arranged to operate as set forth.

4. In a nailing-machine, the frame $a$ and reciprocating driver-bar $b$, in combination with the clamping-tube $f$, having inclined side $f''$, and the cutter-bar $l$, adapted to move across the path of the wire and in contact with said inclined side $f''$, as and for the purpose set forth.

5. In a nailing-machine, the frame $a$ and reciprocating driver-bar $b$, combined with the rock-lever $n$, the cutter-bar $l$, and pivoted guide-piece $m$, with its spring $m''$, as and for the purpose set forth.

In testimony whereof we have affixed our signatures in presence of two witnesses.

WARREN C. EVANS.
JOHN P. SMITH.

Witnesses:
  JOHN O'NEILL,
  WILLIAM P. MOULTON.